May 30, 1950
P. F. DESCH ET AL
2,509,728
REGULATING APPARATUS
Filed May 29, 1946
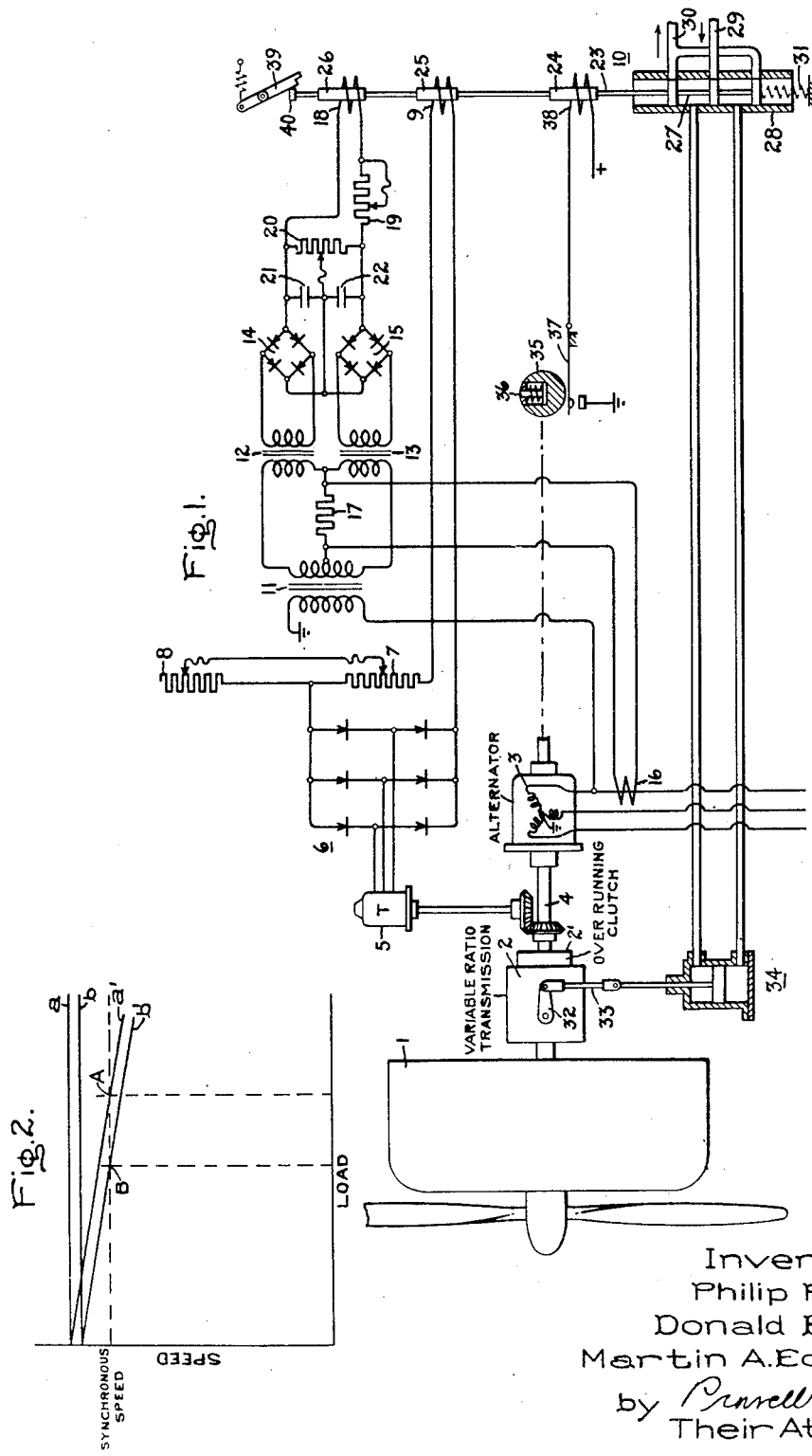
Inventors:
Philip F. Desch,
Donald E. Garr,
Martin A. Edwards,
by Purnell P. Mack
Their Attorney.

Patented May 30, 1950

2,509,728

UNITED STATES PATENT OFFICE 2,509,728

REGULATING APPARATUS

Philip F. Desch and Donald E. Garr, Schenectady, and Martin A. Edwards, Scotia, N. Y., assignors to General Electric Company, a corporation of New York Application May 29, 1946, Serial No. 672,984

17 Claims. (Cl. 322—23)

Our invention relates to a regulating apparatus for dynamo-electric machines and more particularly to improvements in a regulating apparatus for electric generators operating in parallel from variable speed prime movers.

In the past few years there has been a definite trend in certain types of military and commercial aircraft toward larger airplanes and airplanes of the multi-engine type. There has also been a large increase in the amount and size of the many and varied forms of electrical apparatus which are installed thereon, and perform a wide variety of functions on such aircraft. This has necessitated the installation on such aircraft of electrical power generating sources of increased capacity in order to supply the demand of the installed electrical apparatus. In providing for the increased electrical power supply on aircraft, a serious problem arises in the inherent variable speed nature of the internal combustion engine as customarily utilized on aircraft. Flight conditions often demand more than a 3:1 speed range of the main engines and in addition all engines do not necessarily operate at the same speed during a flight. In order to provide for the increased electrical demand, it is advisable to provide an electric generator for each aircraft engine and arranged to be driven by a mechanical or hydraulic transmission from the engine propeller shaft. Under these extreme variable speed conditions, it is essential that some form of a variable ratio transmission be coupled between each prime mover and its electric generator so that the operating speed of the electric generator may be maintained constant throughout the widely variable speed ranges of the aircraft engine. In order to achieve satisfactory parallel operation of electric generators when arranged in this manner, it is necessary to maintain substantially constant frequency of output voltage of such generators at all values of load so that the division of electrical load between the generators will be maintained as nearly equal as is possible.

It is, therefore, an object of our invention to provide a new and improved regulating system for dynamo-electric machines.

Another object of this invention is to provide a regulating system for the control of electric generators operating in parallel from variable speed prime movers.

A further object of this invention is to provide an improved regulating system for maintaining synchronism and equal division of electrical load between electric generators operating in parallel from variable speed prime movers.

Another object of this invention is to provide an improved regulating system for maintaining substantially constant frequency and equal division of load between aircraft electrical generators and having quick response control characteristics.

Another object of this invention is to provide a new and improved regulating system for the successful parallel operation of internal combustion engine-driven alternating current generators including a variable ratio transmission and high speed governing system.

According to our invention, the above and other objects and advantages are obtained by providing an electric generator arranged to be driven by a variable speed prime mover, such as an aircraft engine, through a variable speed power transmission. An alternating current generator is shown for purposes of description, but the system, with modifications, is equally applicable to direct current generators. In order to make the regulating system responsive to speed, a tachometer generator is also driven at the same or at a proportional speed as the alternator rotor and its output is rectified and passed through one coil of a multiple-coil solenoid pilot valve mechanism. To provide control of the apparatus in response to electrical load on the generator, a watt-measuring or watt-responsive circuit is utilized and the output of this circuit is effective to also exert a controlling action on the same hydraulic pilot valve. A preferred type of watt-responsive system is that described and claimed in Patent 2,388,527, granted November 6, 1945, upon an application of Frederick E. Crever and assigned to the same assignee as the present invention. The coordinated action of the speed responsive circuit and the generator load responsive circuit on the hydraulic pilot valve is effective to control the supply of high pressure oil to a servo mechanism which, in turn, actuates a ratio adjusting means for varying the transmitted speed of the variable transmission. The speed of the electric generator is thereby maintained at or restored to the predetermined required value so that parallel operation and equal division of load with other generators being controlled by the same regulating apparatus is satisfactorily accomplished.

For a more complete understanding of our invention and a further appreciation of its objects and advantages, reference should now be had to the following detailed description taken in conjunction with the accompanying drawing, and its scope will be pointed out in the appended claims. In the drawing, Fig. 1 is a diagrammatic illustration of a preferred embodiment of our invention; and Fig. 2 is a graphical representation of certain of the operating characteristics of two alternators being controlled in parallel by regulator apparatus.

Referring now to the drawing and more particularly to Fig. 1, there is shown, by way of example, an inherently variable speed type of prime mover, such as an aircraft engine 1, arranged to drive a variable ratio power transmission 2 which may be any of several well known types such as the swash plate or wobbler plate type, and should be capable of both underdrive and overdrive, and operating over a speed range having a ratio of at least 3 or 4:1. The variable ratio transmission 2 is provided with an overrunning clutch or unidirectional power transmission on its output drive shaft, the overrunning clutch being schematically illustrated at 2'. An electric generator 3, which is shown as a three phase alternating current generator, Y connected with grounded neutral, is connected to the output or constant speed shaft 4 of the variable transmission 2, and thus arranged for constant speed operation. Also driven by the constant speed shaft 4 is a tachometer generator 5 of any suitable type which will produce a voltage proportional to speed, and preferably may be a small three phase alternating current generator of the permanent magnet field type. As arranged its electrical output will be directly proportional to the speed of the main alternator 3. The output of the tachometer generator 5 is passed through a full-wave rectifier of the dry type such as a copper oxide or selenium rectifier, and the resulting direct current voltage applied to a control circuit consisting of a variable resistance 7, a second variable resistance 8 arranged in shunt relationship, and one coil 9 of the solenoid-operated hydraulic pilot valve shown generally at 10. The variable resistance 7 is for purposes of adjustment so that the correct no-load speed, corresponding to the desired output frequency of the alternator 3, may be set. The shunt-connected variable resistance 8, which acts as a vernier for making small adjustments to the frequency setting provided by the variable resistance 7, is preferably located on the pilot's control panel, or at some other convenient location, so that small adjustments may be made by the operator during flight to compensate for small changes in the division of load between generators. The load responsive circuit of our regulating system includes a voltage responsive circuit which comprises a potential transformer 11 having its primary excited by one phase voltage of the alternator 3. The secondary winding of the transformer 11 includes in series relationship the primaries of the auxiliary transformers 12 and 13. The secondary windings of the auxiliary transformers 12 and 13 are connected to the input terminals of a pair of full wave rectifiers 14 and 15 which also may be of the selenium or copper oxide type. The circuit as thus far described is a voltage responsive circuit in which the alternating current voltages supplied to the input terminals of the rectifiers 14 and 15 are equal in magnitude but opposite in polarity. A voltage component proportional to the output current of the alternator 3 is introduced into the load responsive circuit by means of the current transformer 16 and the resistor 17 which is connected in series between the midpoint of the secondary of the transformer 11 and the common point of the primary windings of auxiliary transformers 12 and 13. The voltage drop appearing across the resistor 17 is thus vectorially added to the voltages impressed on the input terminals of the rectifiers 14 and 15. The output terminals of the rectifiers 14 and 15 are connected in series and opposed in polarity and are connected to a circuit comprising an operating coil 18 of the solenoid actuated pilot valve and an adjustable resistance 19. Arranged across the coil 18 and adjustable resistance 19 is a variable resistor 20 which acts as a voltage divider for adjusting the electrical balance of the direct current circuit to insure no current flow in the coil 18 when no load current is being supplied by the alternator 3. Capacitors 21 and 22 are arranged in shunt relationship across the output terminals of the rectifiers 14 and 15 to impart a smoothing effect to the direct current output of the rectifiers.

The hydraulic pilot valve assembly, shown generally at 10, includes an operating extension shaft 23 which is connected to the solenoid armatures 24, 25 and 26. It should be understood that this representation is schematic and that for practical purposes the windings 9 and 18 could be concentrically wound on a coil form, within which a single movable plunger or armature would be provided. The shaft 23 is connected directly to the pilot valve 27 which is disposed within the casing 28. Hydraulic oil under pressure is supplied to the inlet port 29 and returned to an oil pressure supply system (not shown) through the drain port 30. The valve shoulders are arranged so that both the inlet port 29 and the outlet port 30 are closed when the valve is in the position as shown in Fig. 1. In the position shown, the pilot valve is floating and the actuating force produced by the current in the speed responsive winding 9 is exactly balanced by the opposing force exerted by the compression spring 31. In this position the apparatus would be operating at a desired load and frequency and there would be, therefore, no tendency for movement of the pilot valve assembly. The variable speed transmission 2 has its ratio adjusting arm 32, as illustrated schematically, arranged for rotary movement and connected at the outer end thereof is a link 33 for operating this arm by the servo mechanism assembly 34. The servo mechanism 34 is actuated in response to the position of the pilot valve 27 and for purposes of illustration and description it is assumed that the piston and linkage 33 will move in an upward direction when it is desired to increase speed of the alternator, and conversely will decrease alternator speed when actuated in a downward direction.

An additional safety feature is provided in a means for shutting down or reducing alternator speed in case of an excessive or severe overspeed on the part of the prime mover which is beyond the range of regulation by the variable speed drive and the associated control system. This includes a speed-responsive, centrifugally-actuated switch comprising a rotary member 35 mechanically connected to the alternator shaft and having an inwardly spring-biased trigger member 36 which is forced outwardly by centrifugal force in the event the speed of the alternator reaches an excessive level. When extended outwardly the trigger member 36 will engage the key switch blade 37 and force it downward, thus closing the switch contacts and causing current to flow through the coil 38 disposed around the armature 24 mounted on the extension shaft 23. Excitation of this winding forces the pilot valve to the extreme position for low speed output of the variable speed transmission. Current for energizing the coil 38 may be taken from the aircraft's direct current system or any other suitable source of direct current available. Upon operation of the overspeed safety device, the pilot valve and associated actuating member 23 are depressed to the extreme position and the spring-biased latch member 39 snaps into place to engage the shoulder 40 at the upper end of the operating member 23. This effectively locks the mechanism in reduced speed position and requires a manual resetting by the operator before automatic regulation can again be assumed. However, it will readily occur to those skilled in the art that if a suitable auxiliary power source is not available a centrifugally operated overspeed device, similar to a flyball governor, may be employed to actuate the pilot valve 27 to its reduced speed position in the event of an extreme overspeed of the prime mover.

Operation of our regulator system is best described by considering it as two different condition-responsive governing systems; the first, a speed responsive system acting to maintain constant speed and frequency on the alternator by proper adjustment of the variable ratio transmission, and a second system responsive to the load being supplied by the alternator which is effective to modify the speed characteristics previously mentioned.

The speed responsive system operates in substantially the following manner: The output voltage of the tachometer generator 5 is directly proportional to the speed of the main alternator. This voltage is rectified by the full-wave rectifier 6 and passed through the adjusting resistors 7 and 8 to the pilot valve control coil 9. The resistance values of 7 and 8 are adjusted so that under steady state conditions and with the alternator rotating at proper speed to produce rated frequency, the current passing through the governor control coil 9 will be sufficient to balance the pilot valve 27 against the force of the spring 31 and the valve assembly will be floating or positioned as shown in Fig. 1. Thus under these conditions there is no movement of the pilot valve 27 or the servo mechanism 34, and the variable speed transmission maintains the proper ratio to provide the desired constant frequency of the main alternator. Any change in output speed of the variable ratio transmission, due to either variation in load or input speed changes from the engine 1, results in a momentary increase or decrease, as the case may be, of the current through the governor control coil 9, thus unbalancing the pilot valve assembly and allowing oil under pressure to flow through the servo mechanism 34 and actuate the arm 32 of the variable speed transmission 2 to adjust the output speed of the variable speed transmission in a direction to restore the alternator speed to its original predetermined setting.

For successful parallel operation alternators should be controlled so that their speed decreases with increasing load. In Fig. 2 the upper graphs $a$ and $b$ are representative of speed-load characteristics of two alternators having speed control and slightly different no-load speeds, but having no modification of the speed characteristics for increasing load. This is illustrated to show that parallel operation would be impossible as both machines have unstable load characteristics, the load point moving freely along the line $a$ or $b$, as the case may be, and parallel operation with fixed division of load would be impossible. In order to insure succesful parallel operation, the governing system must be operative to give a drooping speed-load characteristic to the alternator. Thus in Fig. 2 the graphs $a'$ and $b'$ are illustrative of the same two machines controlled in accordance with our invention and having the desirable drooping speed-load characteristics. For purposes of illustration, the same initial no-load speed differences have been maintained. It can be seen that the machines controlled in accordance with graphs $a'$ and $b'$ will now operate with stability in parallel and the amount of load carried by each alternator for any given total load is represented by the points A and B, respectively, in Fig. 2. It should be pointed out that the graphs of Fig. 2 are not drawn to scale, and the percentage of droop from no-load to full-load has been intentionally exaggerated for purposes of illustration. Also, by use of the adjusting resistances 7 and 8 the no-load speed values can be made identical, thus providing equal division of load between the two alternators.

This desirable speed-load characteristic is obtained by use of the watt responsive circuit previously described and also shown in the Crever Patent No. 2,388,527. A phase voltage of the alternator is supplied to the primary of the transformer 11, and the secondary winding of transformer 11 is connected in series with the primaries of the identical transformers 12 and 13. The secondaries of transformers 12 and 13 are connected to full-wave rectifiers, and the outputs of these rectifiers are arranged so that the output signals are subtractive or differential. In order to measure real power or watts load on the alternator, a signal proportional to current is vectorially added to or subtracted from the voltage signal occurring across the primaries of the transformers 12 and 13. It will, therefore, be understood that when the alternator is operating at no load or under a zero power factor load the voltage component proportional to load current will have no in-phase or real power component, the voltages in the auxiliary transformers 12 and 13 will be vectorially equal, the outputs of the rectifiers 14 and 15 will be equal and in opposition and there will be no current flow in the governor control coil 18. However, if real power is being supplied by the alternator, a voltage having an in-phase component will be produced in the resistor 17, caused by the flow of load current in the current transformer 16, and this voltage component will be additive vectorially in one auxiliary transformer and subtractive vectorially in the other auxiliary transformer. Consequently, a direct current proportional to the difference of these values exists in the circuit of the pilot valve coil 18 and its magnetic force is applied in a direction to aid the governor coil 9 in movement of the pilot valve assembly. The variable resistor 19 is provided in the governor control coil circuit for the purpose of adjusting the percentage of droop desired in the alternator speed-load characteristic. The droop circuit as described is insensitive to reactive power current and responsive proportionately to real power current.

The use of the overrunning clutch 2' in the power input shaft to the alternator is of material advantage in maintaining synchronism between machines during rapid deceleration of the aircraft engines. The clutch thus permits the engine to drive the alternator but prevents the alternator from attempting to drive the engine. In case of rapid deceleration of one engine, the normal synchronizing torque of its alternator will maintain it in synchronism with the other alternator during the short interval of time required for the regulating system to adjust the variable ratio transmission to restore rated input speed to the alternator shaft.

It has been found that the control apparatus as described herein is extremely rapid in operation due to the relatively small movement required in the pilot valve and the existing condition of balance on the pilot valve assembly. With the assembly in a condition of balance, a small change in either speed or load will consequently produce a change in the energizing current of coil 9 or coil 18, or both, thereby moving the pilot valve in a direction to adjust the variable ratio transmission to maintain constant alternator speed and frequency. In one practical embodiment of our invention it was found that during short periods of rapid acceleration or deceleration of the engine, the regulator commenced action to restore rated alternator speed conditions before the end of the engine acceleration period, and synchronism with the other alternator was maintained.

From a consideration of the foregoing, it will be seen that we have provided a governing or regulating system which is sensitive to speed and real power variations, and in addition has a very high rate of response to speed or load changes. The provision of droop control by which the output characteristics of two or more alternators operating in parallel can be adjusted and maintained, functions to give successful parallel operation in this type of an apparatus, and load division among the several alternators is adequately maintained even under severe variations in prime mover speed.

While we have shown and described a particular embodiment of our invention, it will be obvious to those skilled in the art that changes and modifications may be made therein without departing from our invention in its broader aspects, and we, therefore, aim in the appended claims to cover all such changes and modifications as fall within the true spirit and scope of our invention.

What we claim as new and desire to secure by Letters Patent of the United States is:

1. A regulating system for a dynamo-electric machine including a variable speed prime mover for driving said machine, said prime mover normally operating over a considerable range of speeds, said system comprising a variable-speed power transmission interposed between said prime mover and said machine, means responsive to the speed of said machine for adjusting said variable speed power transmission to maintain said speed at a selected regulated value, and electrical network means responsive to the power output of said machine for modifying the action of said speed responsive means to vary said regulated value in accordance with variations in power output thereby to permit parallel operation of said machine, said network means comprising means for deriving a signal voltage responsive to the voltage output of said machine, means for deriving another signal voltage responsive to the current output of said machine and means for combining vectorially said two signal voltages.

2. A regulating system for a dynamo-electric machine including a variable speed prime mover for driving said machine, said prime mover normally operating over a considerable range of speeds, said system comprising a variable ratio power transmission interposed between said prime mover and said machine, a unidirectional power transmission interposed between said variable ratio transmission and said machine for permitting said prime mover to drive said machine but preventing said machine from driving said prime mover, means responsive to the speed of said machine for adjusting said variable ratio power transmission to maintain said speed at a regulated value, means responsive to the electrical power output of said machine for modifying the action of said speed responsive means so that said regulated speed value is reduced as power output increases, and means operative in excess of a predetermined maximum speed of said machine to render ineffective said speed responsive means and said last mentioned means.

3. A regulating system for a dynamo-electric machine including a variable speed prime mover for driving said machine, said prime mover normally operating over a considerable range of speeds, said system comprising a variable speed power transmission interposed between said prime mover and said machine, means for adjusting the speed ratio of said transmission, means responsive to the speed of said dynamo-electric machine for controlling said ratio adjusting means to maintain the speed of said dynamo-electric machine substantially constant at a regulated value, and electrical network means responsive to the electrical power output of said dynamo-electric machine for modifying the action of said speed responsive means so that said dynamoelectric machine exhibits a drooping speed-load characteristic, said network means comprising means for deriving a first signal voltage responsive to the voltage output of said machine, means for deriving a second signal voltage responsive to the current output of said machine and means for combining said two signal voltages.

4. A regulating system for a dynamo-electric machine including a variable speed prime mover for driving said machine, said prime mover normally operating over a considerable range of speeds, said system comprising speed adjusting means effective to maintain said machine speed substantially constant at a predetermined level irrespective of the speed of said prime mover, means responsive to the speed of said machine for controlling said speed adjusting means to maintain said speed substantially constant at a selected regulated value, and electrical network means responsive to an electrical condition of said machine and effective to modify the controlling action of said speed responsive means to select said regulated value in accordance with variations in the value of said condition so that said dynamoelectric machine exhibits a drooping speed-load characteristic.

5. A regulating system for a dynamo-electric machine including a variable speed prime mover for driving said machine, said prime mover normally operating over a considerable range of speeds, said system comprising variable speed power transmission means interposed between said prime mover and said machine, unidirectional power transmission means interposed between said variable speed power transmission means and said machine for permitting said prime mover to drive said machine but preventing said machine from driving said prime mover, means for adjusting said variable speed power transmission means to maintain constant at a predetermined value the speed of said machine, means responsive to the speed of said machine for actuating said adjusting means, and electrical network means responsive to an electrical condition of said machine for modifying the action of said speed responsive means to vary said predetermined value in accordance with variations in the value of said condition.

6. A regulating system for a dynamo-electric machine including a variable speed prime mover for driving said machine, said prime mover normally operating over a considerable range of speeds, said system comprising a variable speed-ratio power transmission interposed between said prime mover and said machine, means for adjusting the ratio of said transmission means to maintain constant the speed of said dynamo-electric machine at a predetermined value, means responsive to the speed of said dynamo-electric machine for controlling said ratio adjusting means, means responsive to the electrical power output of said dynamo-electric machine for modifying the action of said speed responsive means to decrease said predetermined value as said power output increases, and means operative in excess of a predetermined speed of said dynamo-electric machine to disable said speed responsive means.

7. A regulating system for a dynamo-electric machine including a variable speed prime mover for driving said machine, said prime mover normally operating over a considerable range of speeds, said system comprising a variable speed ratio power transmission interposed between said prime mover and said machine, unidirectional power transmission means interposed between said variable speed ratio power transmission and said machine for permitting said prime mover to drive said machine but preventing said machine from driving said prime mover, ratio adjusting means for said variable speed ratio power transmission effective to maintain said machine speed constant at a predetermined value, means responsive to the speed of said machine for actuating said ratio adjusting means, means responsive to the power output of said machine for modifying the action of said speed responsive means, to decrease said predetermined value as said power output increases and means operative in excess of a predetermined speed of said machine to disable said speed responsive means.

8. A regulating system for an electric generator including a variable speed internal combustion engine for driving said generator, said internal combustion engine normally operating over a considerable range of speeds, said system comprising a variable ratio transmission interposed between said engine and said generator, an overrunning clutch mechanism interposed between said variable ratio transmission and said generator and effective to permit application of only accelerating power to said generator, means responsive to the speed of said generator and operable to adjust the speed ratio of said variable ratio transmission to maintain the speed of said generator substantially constant at a selected regulated value, and electrical network means responsive to the real value of electrical power supplied by said generator for modifying the operation of said speed responsive means to reduce said regulated value as real power increases thereby to permit parallel operation of said generator.

9. A regulating system for an electrical generator including a variable speed internal combustion engine for driving said generator, said internal combustion engine normally operating over a considerable range of speeds, said system comprising a variable ratio transmission interposed between said engine and said generator, an overrunning clutch mechanism interposed between said variable ratio transmission and said generator and effective to permit application of accelerating power only to said generator, means responsive to the speed of said generator and operable to adjust the speed ratio of said variable ratio transmission to maintain the speed of said generator substantially constant at a selected regulated value, means responsive to the electrical load condition of said generator for modifying the operation of said speed responsive means to reduce said regulated value as real power increases thereby to give said generator a drooping speed-load characteristic, and a centrifugally operated overspeed device effective in excess of a predetermined speed of said generator to adjust said variable ratio transmission for minimum output speed.

10. A regulating system for an electric generator including a variable speed internal combustion engine for driving said generator, said internal combustion engine normally operating over a considerable range of speeds, said system comprising a variable speed transmission coupled to the power output shaft of said engine, an overrunning clutch mechanism disposed between the output shaft of said transmission and said generator for permitting said engine normally to drive said generator but preventing said generator from attempting to drive said engine following a sudden deceleration of the latter, adjusting means for maintaining the speed output of said transmission means substantially constant at a predetermined regulated value, said adjusting means including an electromagnetically-operated pilot valve and fluid power piston for actuating said adjusting means, means responsive to the speed of said generator and effective to position said pilot valve, means responsive to the electrical load being supplied by said generator for modifying the position of said pilot valve to reduce said regulated value as load increases, and a centrifugally-operated overspeed device operative in excess of a predetermined speed of said generator to adjust said variable ratio transmission for minimum output speed.

11. A regulating system for an alternator driven by a prime mover subject to speed variations over a wide range, said system including a variable ratio transmission interposed between said alternator and said prime mover, means for adjusting the value of speed transmitted by said variable ratio transmission, means responsive to the speed of said generator for actuating said adjusting means to maintain said generator speed substantially constant at a predetermined regulated value, and electrical network means responsive to the value of real power supplied by said generator for modifying the action of said speed responsive means to so control said regulated value that said generator has a drooping speed-load characteristic, said network means comprising means for deriving a signal voltage responsive to the voltage output of said machine, means for deriving another signal voltage responsive to the current output of said machine and means for combining vectorially said two signal voltages.

12. A regulating system for an alternating current generator including a variable speed internal combustion engine for driving said generator, said internal combustion engine normally operating over a considerable range of speeds, said system comprising a variable speed transmission interposed between said engine and said generator, unidirectional power transmission means interposed between said variable speed transmission and said generator for permitting said engine to drive said generator but preventing said generator from driving said engine, electromagnetically actuated fluid-operated means effective to adjust the value of speed transmitted by said variable speed transmission, electrical network means responsive to the speed of said generator for affecting said electromagnetically actuated means for controlling said fluid power means to hold constant the speed of said generator at a selected regulated value, and electrical network means responsive to the value of real power supplied by said generator proportionately to decrease said regulated value with an increase in real power by affecting said electromagnetically actuated means, said last-named network means comprising means for deriving a signal voltage responsive to the voltage output of said machine, means for deriving another signal voltage responsive to the current output of said machine and means for combining vectorially said two signal voltages.

13. Regulating apparatus for an electric power system comprising an electric generator, a controllable variable-speed power input to said generator, hydraulic means for adjusting said input speed, means responsive to the speed of said generator for actuating said hydraulic means to maintain constant said generator speed at a selected regulated value, and electrical network means responsive to the in-phase power supplied by said generator and effective to modify the action of said speed responsive means to reduce said regulated value as said power increases thereby to give said generator a drooping speed-load characteristic, said network means comprising means for deriving a signal voltage responsive to the voltage output of said generator, means for deriving a second signal voltage responsive to the current output of said generator and means for combining said two signal voltages.

14. Regulating apparatus for an electric power system comprising an electric generator, a controllable variable-speed power input to said generator, hydraulic means for adjusting said input speed value, means responsive to the speed of said generator for actuating said hydraulic means in a direction to maintain constant said generator speed, means responsive to the in-phase power supplied by said generator and effective to modify the action of said speed responsive means to give said generator a drooping speed-load characteristic, and means operative in response to generator speed in excess of a predetermined value to render ineffective said speed responsive means.

15. Regulating apparatus for an electric generator driven by a variable speed engine comprising, means interposed between said engine and said generator for varying the value of speed input to said generator, hydraulic means associated with said speed varying means and operative to adjust said speed varying means, an electromagnetically actuated fluid pressure control valve for operating said hydraulic means, electric means responsive to the speed of said generator for actuating said control valve and effective to maintain said generator speed substantially constant at a predetermined regulated value, and electrical network means responsive to the value of real power supplied by said generator for modifying the action of said speed responsive means to so control said regulated value that said generator has a drooping speed-load characteristic, said network means comprising means for deriving a first signal voltage responsive to the voltage output of said generator, means for deriving a second signal voltage responsive to the current output of said generator and means for combining vectorially said two signal voltages.

16. Regulating apparatus for an electric generator driven by a variable speed engine comprising, means interposed between said engine and said generator for varying the value of speed input to said generator, unidirectional power transmission means for permitting said engine to drive said generator but preventing said generator from attempting to drive said engine, hydraulic means associated with said speed varying means and operative to adjust said speed varying means, an electromagnetically actuated fluid pressure control valve for operating said hydraulic means, electric network means responsive to the speed of said generator for actuating said control valve and effective to maintain said generator speed substantially constant at a predetermined regulated value, and electric network means responsive to the value of real power supplied by said generator for modifying the action of said speed responsive means to so control said speed regulated value that said generator has a drooping speed-load characteristic, said last-named network means comprising means for deriving a signal voltage responsive to the output of said generator, means for deriving another signal voltage responsive to the current output of said generator and means for combining vectorially said two signal voltages.

17. Regulating apparatus for an electric generator driven by a variable speed engine comprising, means interposed between said engine and said generator for varying the value of speed input to said generator, unidirectional power transmission means for permitting said engine to drive said generator but preventing said generator from attempting to drive said engine, hydraulic means associated with said speed varying means and operative to adjust said speed varying means, an electromagnetically actuated fluid pressure control valve for operating said hydraulic means, electric means responsive to the speed of said generator for actuating said control valve and effective to maintain said generator speed substantially constant at a predetermined regulated value, means responsive to the value of real power supplied by said generator for modifying the action of said speed responsive means to so control said regulated value that said generator has a drooping speed-load characteristic, and means responsive to generator speeds in excess of a predetermined maximum for rendering ineffective said speed responsive means and said real power responsive means.

PHILIP F. DESCH.
DONALD E. GARR.
MARTIN A. EDWARDS.

REFERENCES CITED

The following references are of record in the file of this patent:

UNITED STATES PATENTS

| Number | Name | Date |
|---|---|---|
| 1,565,908 | Conwell | Dec. 15, 1925 |
| 1,621,280 | Roucha | Mar. 15, 1927 |
| 2,248,654 | Ballou | July 8, 1941 |